United States Patent [19]

Tachita et al.

[11] Patent Number: 4,696,058
[45] Date of Patent: Sep. 22, 1987

[54] DIVERSITY RECEIVER

[75] Inventors: Ryobun Tachita, Kawasaki; Akio Teranishi, Ebina, both of Japan

[73] Assignee: Matsushita Electric Industrial Co., Ltd., Kadoma, Japan

[21] Appl. No.: 678,161

[22] Filed: Dec. 4, 1984

[30] Foreign Application Priority Data

Dec. 6, 1983 [JP] Japan ................................ 58-230110
Dec. 6, 1983 [JP] Japan ................................ 58-230111
Jul. 13, 1984 [JP] Japan ................................ 59-146446

[51] Int. Cl.$^4$ ............................................. H04B 1/06
[52] U.S. Cl. .................................... 455/277; 455/134; 455/278
[58] Field of Search ............... 455/134, 135, 140, 272, 455/275, 277, 278, 297, 345

[56] References Cited

U.S. PATENT DOCUMENTS

| | | | |
|---|---|---|---|
| 2,729,741 | 1/1956 | Chapman | 455/277 |
| 2,937,268 | 5/1960 | Downie et al. | 455/277 |
| 4,170,759 | 10/1979 | Stimple et al. | 455/277 |
| 4,255,816 | 3/1981 | Grunza et al. | 455/277 |

FOREIGN PATENT DOCUMENTS

| | | | |
|---|---|---|---|
| 2514181 | 9/1975 | Fed. Rep. of Germany | 455/277 |
| 2827572 | 12/1979 | Fed. Rep. of Germany | 455/277 |
| 63116 | 5/1980 | Japan | 455/277 |

OTHER PUBLICATIONS

Microwave Mobile Communications, William C. Jakes, Jr., John Wiley & Sons, 1974, pp. 36–39, 312–317, and 398–401.

Primary Examiner—Jin F. Ng
Attorney, Agent, or Firm—Cushman, Darby & Cushman

[57] ABSTRACT

A diversity receiver provides plural antennas, one receiving part for receiving the radio wave from one of the plural antennas and a control part for selecting one antenna from the plural antennas, wherein the antenna is selected in a manner that an antenna receiving the most intensive radio wave is detected by switching of the plural antennas in-turn in a time period $T_1$, and the detected antenna is selected for receiving an information of the radio wave in a time period $T_2$, the plural antennas may be disposed with distances shorter than a wavelength of the radio wave.

10 Claims, 12 Drawing Figures

4,696,058

DIVERSITY RECEIVER

BACKGROUND OF THE INVENTION

1. Field of the Invention

This invention generally relates to a diversity receiver, and more particularly concerns the diversity receiver for communication by radio-wave, for instance, between a sensor part and a main controller part in a security system and the like.

2. Description of the Prior Art

For instance in a home security system to be used in a usual home, a transmitting and a receiving system for communicating between very short distances has used a low power radio-wave. When a weak or unstable radio-wave signal is received, a part of the signals are likely to disappear under influence of interference by reflection or other causes. In order to prevent such missing portions of the signals, a diversity receiver system has been adopted. Especially in the field of communication of information in a security system, a high reliability is required.

The prior art diversity receiving system is shown in FIG. 12. The prior art diversity receiving system to be used for such object has been constituted to receive a radio-wave which is modulated by the security information by using plural antennas 3, 4 and plural receivers 5, 6 for respective antennas 3, 4. Signals received by each antenna 3, 4 are amplified, converted of its frequency and is filtered by a filter means. Thus, plural output signals are obtained. Intensities of the plural output signals are compared with each other by the comparator 7, and the strongest output signal is selected by a switch 8. The selected signal is demodulated by a demodulator 9, and the information which is contained in the signal is decoded by a decoder 10. This information is displayed or used to control some apparatus. The above-mentioned conventional diversity receiver selects the strongest signal among those the plural antennas have received. Since the plural antennas are set up keeping predetermined distances from each other, a probability that all the signals from the plural antennas are simultaneously attenuated is little, and hence a high reliability receiving is assured.

Nevertheless, the above-mentioned conventional system has a shortcoming in that it requires plural receivers 5, 6. Since each receiver 5, 6 has a complicated circuits, such receivers 5, 6 with plural receiving system is, not only expensive, but also big in size, and consumes much electric power. Furthermore, it is a shortcoming that switching noises is likely to be introduced at switching of the plural receivers 5, 6.

SUMMARY OF THE INVENTION

An object of the present invention is to dissolve the above-mentioned shortcomings in the prior diversity receiver, and to provide a diversity receiver which is small in size, cheap in cost and low in electric power consumption.

Another object of the present invention is to obtain a diversity receiver with a satisfactory diversity receiving effect with only one receiver.

Another object of the present invention is to be obtain a diversity receiver which can be used for the short time comunication, and for the continuous communication.

Further object of the present invention is to obtain a diversity receiver wherein receiving circuit is not switched during the receipt of information.

The diversity receiver of the present invention comprises
at least two antennas,
a receiving part for receiving a signal from the antennas,
connecting means for making selective connection from one of the antennas to the receiving part,
controlling means for controlling the selective connection in a manner that in a first time period one antenna which is receiving the most intensive radio-wave among the plural antennas is selected by comparison of outputs of the plural antennas by in-turn connecting the plural antennas and in subsequent second time period the one antenna selected in the first time period is connected to the receiving part and retained.

DESCRIPTION OF THE PREFERRED EMBODIMENTS

Figure 1:
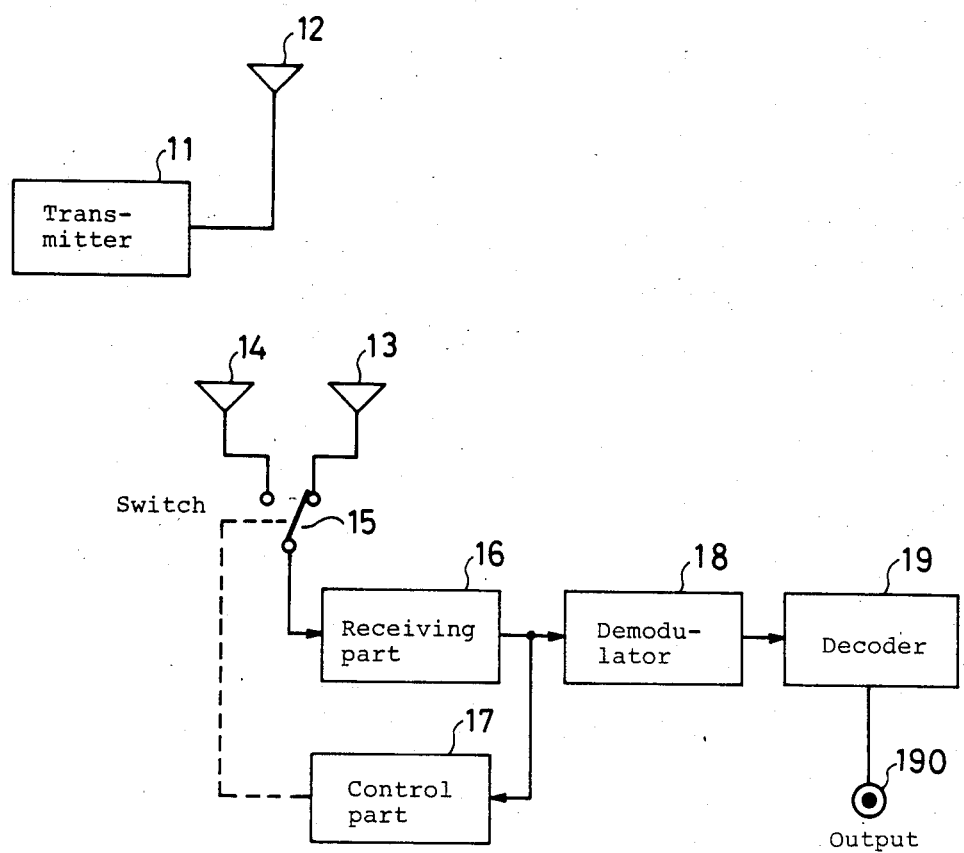
FIG. 1 is a block diagram of a first embodiment of a diversity receiver of the present invention.

FIG. 1 is a block diagram of a first embodiment of a diversity receiver on the present invention.

In FIG. 1, a transmitter 11 gives a radio-wave signal to a transmitting antenna 12, and transmits the radio-waves which are modulated by a certain known security information. The transmitted radio-waves are simultaneously received by two antennas 13 and 14 simultaneously. Output signals of the two antennas 13 and 14 are switched alternately by a switch 15, for instance, an electronic switch, and led to a receiving part 16. Each received signal which is given from said one of the two antennas is amplified by the receiving part 16, and is converted with respect to frequency, filtered and issued as an output. A control part 7 memorizes the incoming signals from the two antennas for short times, and compares the intensities of the memorized signals from the two antennas 13, 14, and finds the signal which is more intense during a first period. The control part 17 controls the switch 15 to connect the receiving the part 16 to the antenna 13 or 14 which is receiving more intense signal and hold such state during a second period.

The received signal from the receiving part 16 is demodulated by a demodulator 18, is decoded by decoder 19 and issued as output signal at an output terminal 190. This output signal is displayed or is used to control some apparatuses.

The details of the control part 17 are elucidated as follows.

Figure 2:
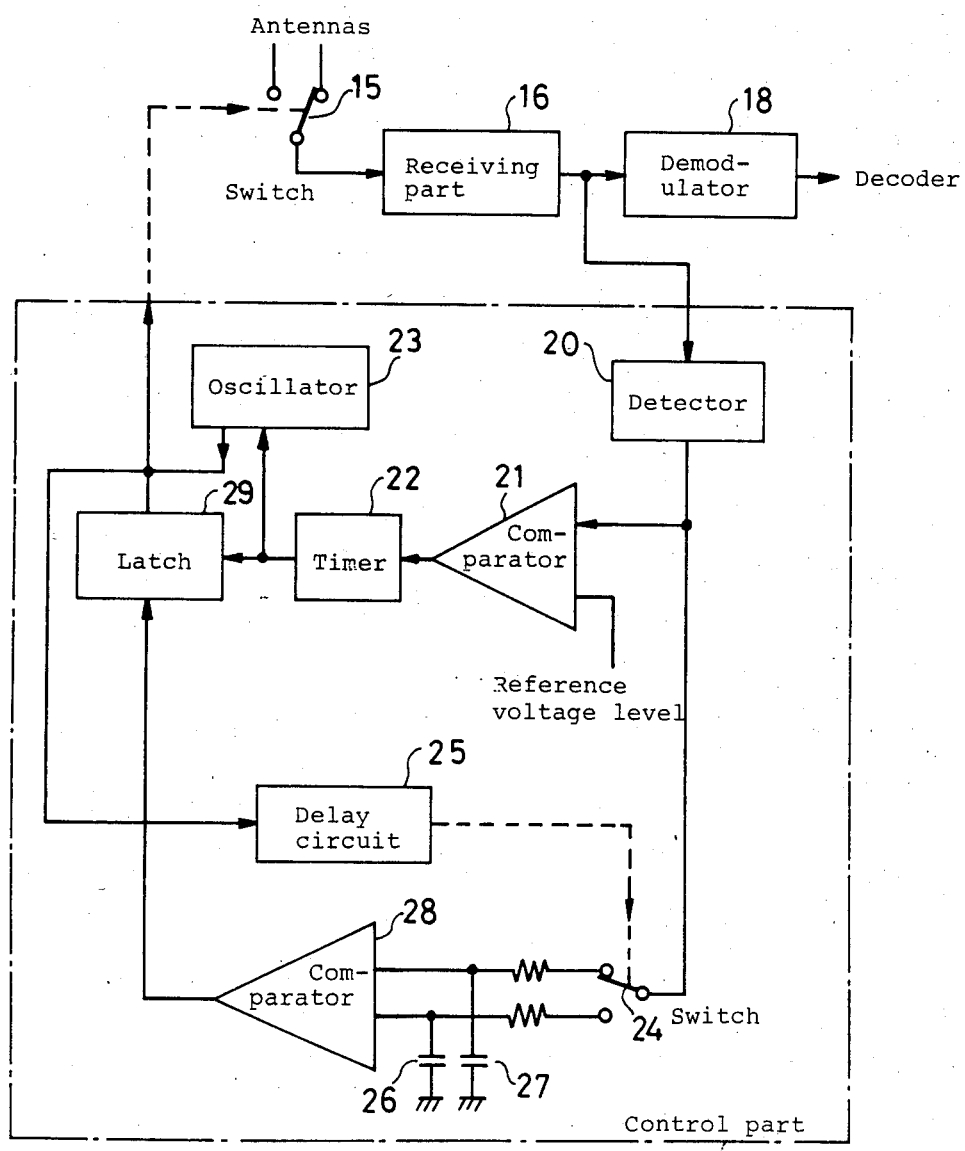
FIG. 2 is a block diagram of a control part of the first embodiment of the diversity receiver.

FIG. 2 is a block diagram of the control part 17. The received signal from the receiving part 16 is detected by a detector 20 of the control part 17 to produce an envelope-detection output signal. Level of the envelope-detected output signal is compared with a reference voltage level at a comparator 21. When the former level is higher than the latter level, the comparator 21 issues an output showing that the radio-wave is received.

Figure 3:
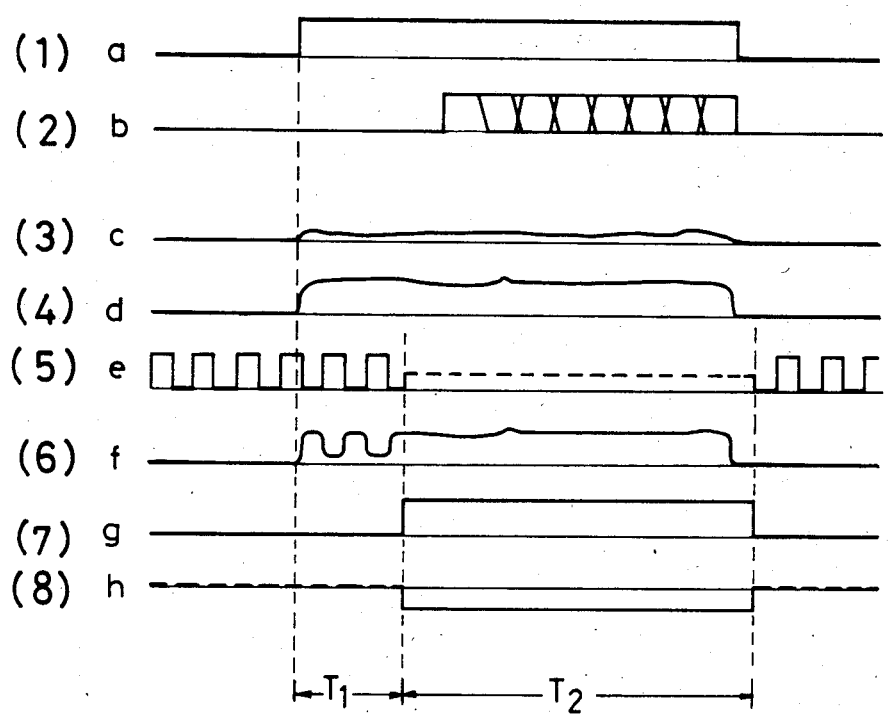
FIG. 3 is a timing chart of the first embodiment of the diversity receiver.

When the output is issued from the comparator 21, the output of the comparator 21 is applied to the timer 22. The oscillator 23 and the latch 29, of a type having a three-state output, are used. The timer 22 controls the oscillator 23 to an enable state and controls the latch 29 to a disable state during the first timing period. The timer 22 controls the latch 29 to an enable state and controls the oscillator to a disable state during the second timing period. An oscillator 23 drives the switch 15 and 24 during the time period defined by the timer 22. The switch 15 and 24 are switched periodically during the first time period. The radio-wave of the transmitter 11 is designed, as shown in FIG. 3, to have a no-information part during the first time period $T_1$. This period is defined a first period $T_1$ shown in the time-chart of FIG. 3. The frequency of the oscillator 20 is 2 KHz in this embodiment. At the time-up of the timer 22, it issues a time-up signal for starting a second time period $T_2$. The transmitter 11 is designed to bear the information for security during the second time period. The signal given to the switch 24 through the receiving part 16 and the detector 20 is delayed by a certain delay time. Therefore, the driving of the switch 24 must be delayed by such time. The delay is compensated by a delay circuit 25. Therefore, the switch 24 delays to the switch 15 by the certain delay time in operation. Two capacitors 26, 27 are charged by the signals from two antennas 13, 14, respectively through the switch 24, for memorizing the intensity level of the two received signals for a short time to enable comparison. Two voltage levels of two capacitors 26, 27 are compared by the comparator 28. The output of the comparator 28 depending on the voltage levels of the two capacitor 26, 27, controls the latch 29 at the end of the first period $T_1$. After a lapse of the first period $T_1$, the switches 24 and 15 are controlled by the signal of the latch 29 instead of the signal of the oscillator 23, and it is memorized by the latch 29 which of the antennas has received a stronger radio-wave. Thus the latch holds the switch 15 for holding the connection of the antenna receiving the stronger radio-wave to the receiving part during a second time period $T_2$.

The operation of the embodiment of FIGS. 1 and 2 is elucidated with reference to the timing chart of FIG. 3.

The signal (a) shown by waveform (1) of FIG. 3 shows the period that the transmitter 11 transmit the radio-wave. The signal (d) shown by waveform (2) shows the modulation signal in which the information of data is included. Frequency modulation is applied to the radio-wave, for instance, in this embodiment. The modulation starts with some delay to the start of transmission of radio-wave as shown in waveform (b). The signal (c), (d) shown by waveforms (3) and (4) show the received signals by the two antennas 13 and 14, respectively. The signal (e) shown by waveform (5) shows the output signal of the oscillator 23. When it is high level, the antenna 13 is selected, when it is low level, the antenna 14 is selected. The signals (f), (g) and (h) shown by waveforms (6), (7) and (8) show output signals of the detector 20, the timer 22 and the latch 29, respectively. These signals (f), (g) and (h) shown by waveforms (6), (7) and (8) show that the antenna 14 is selected, because the voltage level of the waveform (f) at the period of the low level of the waveform (e) is higher than that at the period of the high level of the waveform (e), at this time the output level of the latch is held at low level.

According to this embodiment, the input signals from the two antennas 13, 14 are compared of the intensity of the signals with each other by alternate switching of the switch 15. The antenna which has detected stronger signal is selected for the second period $T_2$, and the diversity effect is obtained by using the simple control part 17 and only one receiving part 16. Since the control part and the receiving part have complicated construction with a large number of active devices, this embodiment enables drastic decrease of electric power consumption and the cost of the diversity receiver in comparison with the prior art. Furthermore, the noise due to switching is prevented, because the switching does not operate during the second time period $T_2$, wherein the information is transmitted.

Figure 4:
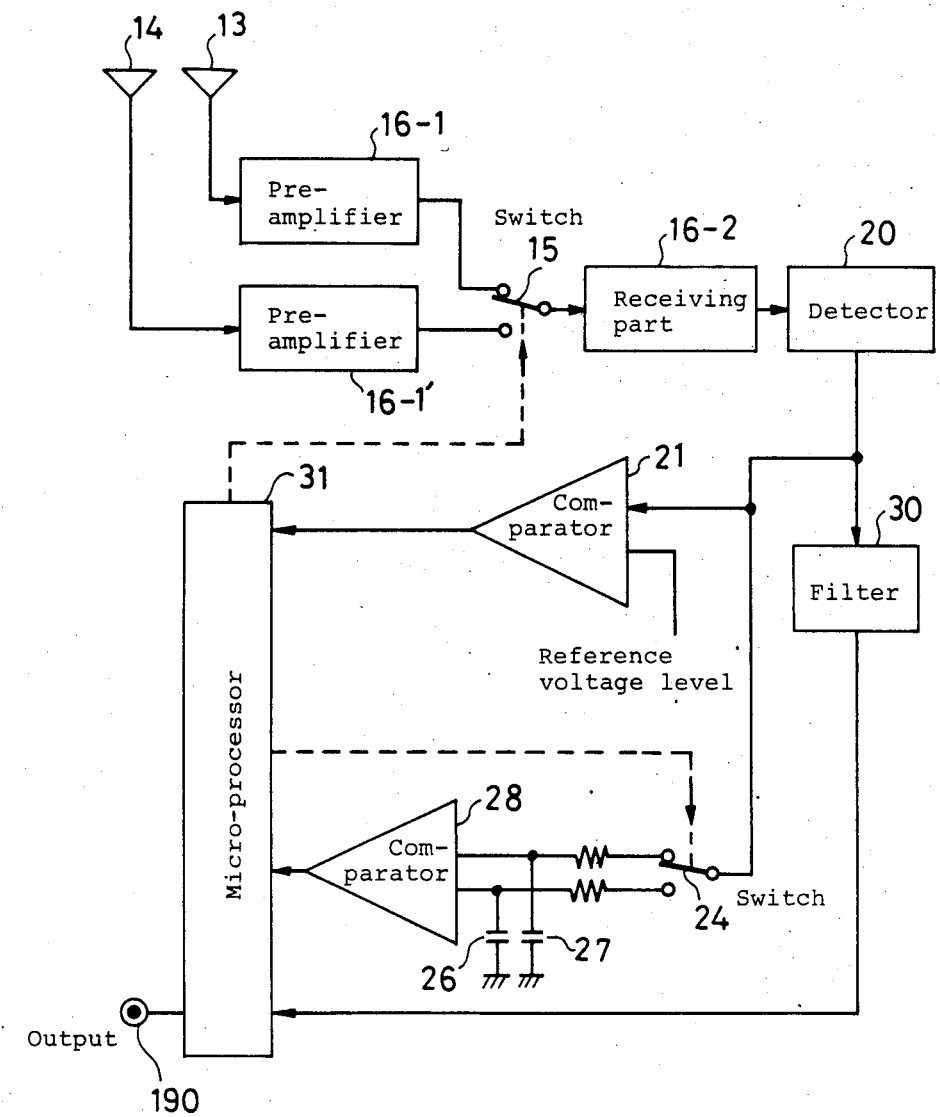
FIG. 4 is a block diagram of a second embodiment of a diversity receiver of the present invention.

The block diagram of a diversity receiver of a second embodiment of the present invention is shown in FIG. 4.

Figure 5:
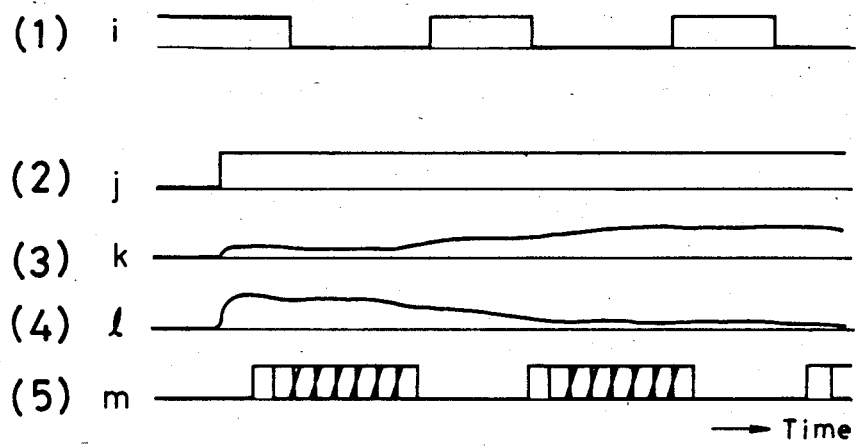
FIG. 5 is a wave-form chart of the second embodiment of the diversity receiver.

Two antennas 13 and 14 are connected to two preamplifier 16-1 and 16-1', respectively. The switch 15 is disposed between those preamplifier and the receiving part 16-2. A demodulator part is constituted with the detector 20 and the filter 30, so that an amplitude-modulated signal from a transmitter 11 may be received. A microprocessor is provided instead of the timer 22, the delay circuit 25, the latch 29, the oscillator 23 and the decoder 19 of the control part 17 of the first embodiment of FIG. 2. In this second embodiment, the amplitude-modulated signal is used instead of the frequency-modulated signal on the first embodiment, and other parts of the diversity receiver are similar to that of the first embodiment. In the above-mentioned first and second embodiments, each functional circuit can be exchanged to other various known circuits which have the same functions. In case that the transmitted signal is a continuous radio-wave signal (j) shown by waveform (2) of FIG. 5 instead of the waveform (a) shown in FIG. 3 (1), both receivers shown in FIG. 1 and FIG. 4 can receive it. Furthermore, in case that the transmitted signal is continuous as shown by waveform (2) of FIG. 5, the intensities of the receiving signals change as shown by the waveforms (3) and (4) of FIG. 5, for example, the signal (k) shown by waveform (3) of FIG. 5 shows the receiving signal by the antenna 13, and the signal (l) shown by waveform (4) of FIG. 5 shows that by the antenna 14, the intensities of the receiving signals of the two antennas reverse on the half way of the time. In above-mentioned case, the information to be transmitted is divided in some blocks along the sequence of timing as shown by the waveform (m) in FIG. 5 (5). The intensity of the received signals from the two antennas are compared with each other at the time of middle of the blocks again. The diversity receiver shown in FIG.

4 can treat its signal, and also the diversity receiver shown in FIG. 2 can treat its signal, because the decoder 19 can control the timer 22. In order to simplify the circuit, it is possible to dispense with the delay circuit 25. Many antennas, for instance, more than three, are easily used.

Figure 6:
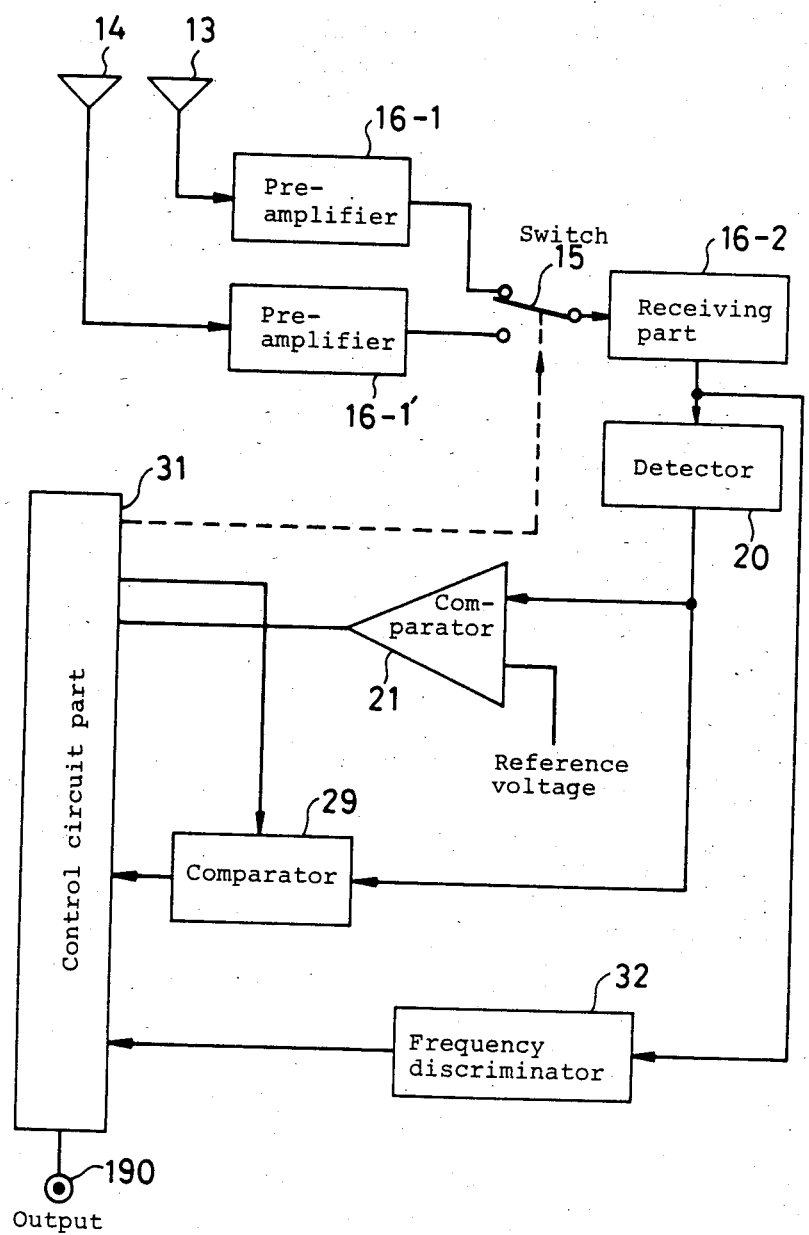
FIG. 6 is a block diagram of the third embodiment of the diversity receiver of the present invention.

The block diagram of the third embodiment of the present invention is shown in FIG. 6. In FIG. 6, two antennas 13 and 14 detect the radio-waves. The detected signals are amplified by the preamplifier 16-1 and 16-1', respectively, and switch 15 selects one of the two outputs of the preamplifiers. The selected signal is frequency-converted and is amplified. The detector 20 detects the envelope of the signal. The detected signal is compared with the reference voltage by the comparator 21, and the output to show the receiving of the transmitted radio-wave is issued. When the detected signal is issued at the output of the comparator 21 by the reception of the radio signal, the intensity of the signals from two antennas 13 and 14 are compared with each other by the comparator 29 by controlling the switch 15 to be switched alternately. And the antenna which received stronger radio-wave is selected by the switch 15. A frequency discriminator 32 demodurates the output signal of the receiving part 16-2. The information included in the signal is sent to a control circuit part 31, and the information is decoded and issued as the output.

The details of the comparator 29 are elucidated below with reference to FIG. 7.

Figure 7:
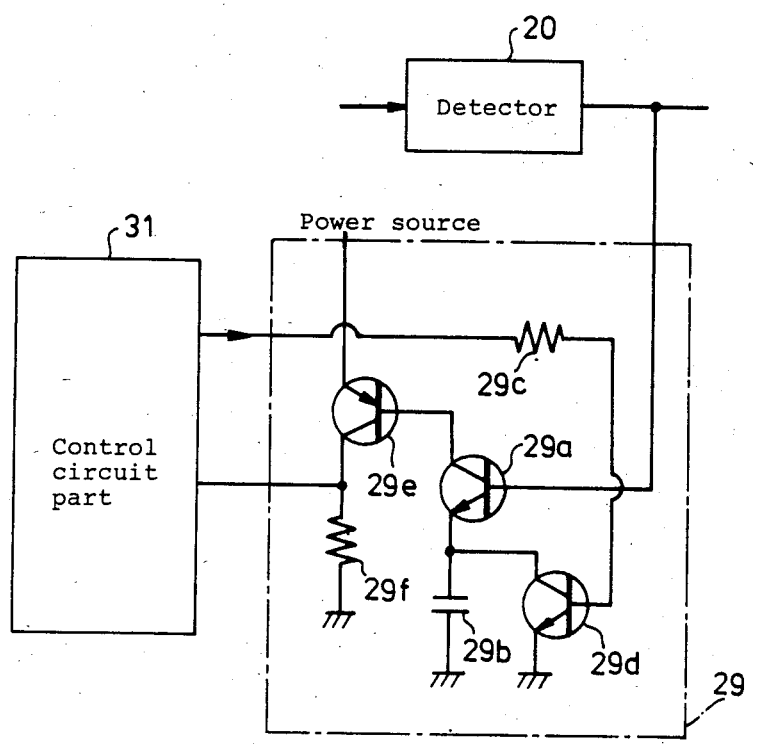
FIG. 7 is a circuit diagram of a comparator of the third embodiment of the diversity receiver.

FIG. 7 shows the details of the circuit of the comparator 29. The detected signal from the detector 20 is applied to the base of the peak hold circuit which is constituted with a transistor 29a and a capacitor 29b connected in series. A transistor 29d is connected by the collector and emitter across both ends of the capacitor 29b and by the base through a resistor 29c to the control circuit part 31 which controls the transistor switch 29d through the resistor 29c connected in series to the collector of the transistor 29a. The collector of the transistor 29a is connected to the base of a transistor 29e whose collector is connected to the input terminal of the control circuit 31. When a control signal is given from the control circuit 31 to the base of the transistor 29d, the latter transistor 29d discharges the electric change of the capacitor 29b. The current for charging the capacitor 29b through the transistor 29a is detected by a series circuit of the transistor 29e, and a resistor 29f, and the detected signal is given to the control circuit part 31.

Figure 8:
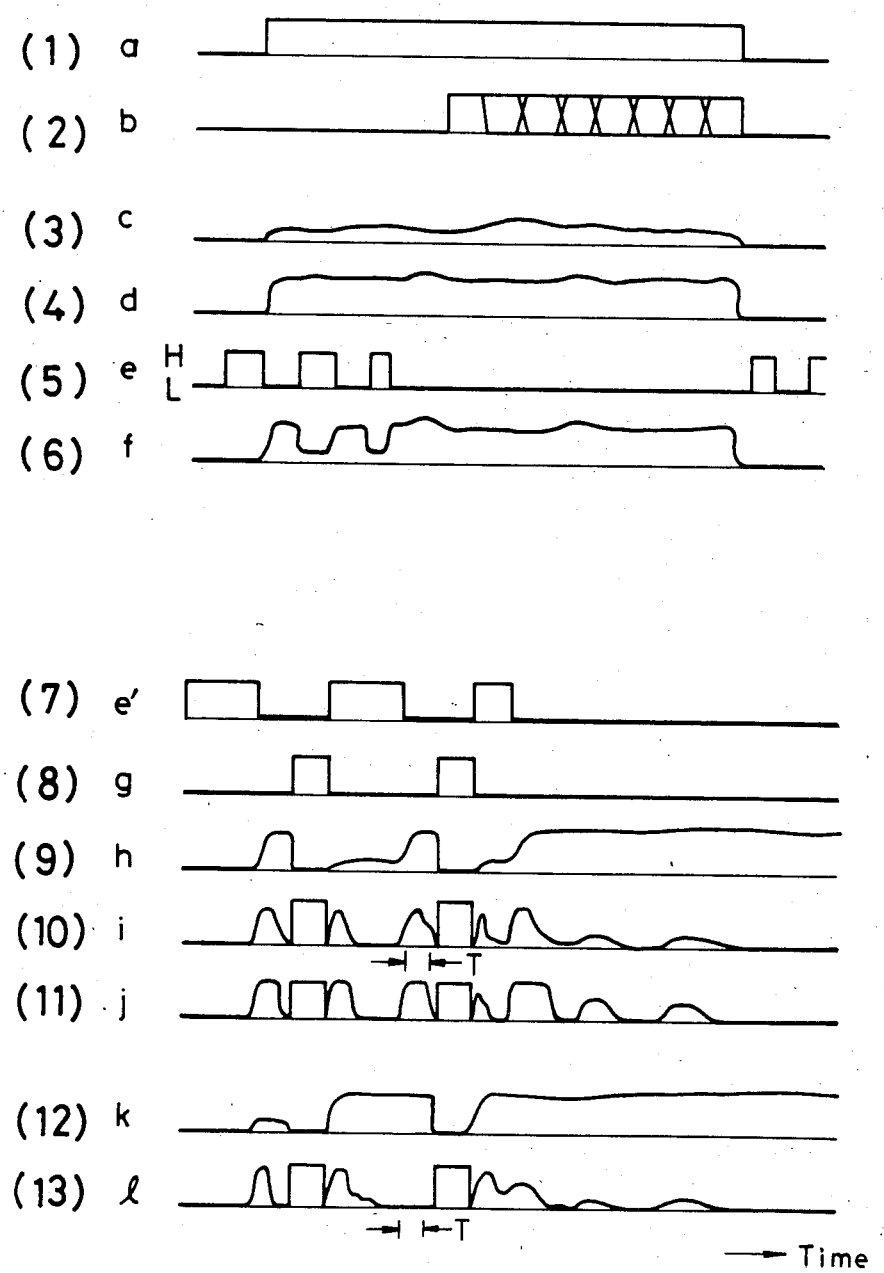
FIG. 8 is a timing chart of the third embodiment of the diversity receiver.

FIG. 8 is the timing chart for showing the above-mentioned operation. In FIG. 8, the signal (a) shown by waveform (1) shows the period of the arrival of the radio-wave, and the signal (b) shown by waveform (2) shows the timing when signal of information in the transmitted signal starts. The signals (c) and (d) shown by waveforms (3) and (4) show the intensities of the radio-waves which is received by the antennas 13 and 14, respectively, and the signal (d) shown by waveform (4) shows signal received by the antenna 14, which is receiving stronger radio-wave than the antenna 13. The signal (e) shown by waveform (5) shows the positions of the switch 15, and the high level shows the state that the antenna 13 is selectively connected, and the low level shows that the antenna 14 is selectively connected. The waveform (f) shows the output signal from the detector 20, and corresponds to the intensity of the radio-wave of the antenna which is selected by the switch 15. The waveform (e') shows enlarged waveform of the left part of the waveform (e) showing the position of the switch 15. The waveform (g) shows the signal applied to the base of the transistor 29d. Therefore, the transistor 29d is made ON in the time period T shown in the waveform (e'), which is in a period when the antenna 14 is selected.

The waveform (h) shows the voltage which is applied to the capacitor 29b, which holds the peak output voltage of the detector 20 shown in the waveform (f). When the transistor 29d is made ON, the voltage in the capacitor 29b becomes zero. The waveform (i) in FIG. 8 shows the charge current for charging the capacitor 29b through the transistor 29a. When the output voltage of the detector 20 exceeds the voltage held in the capacitor 29b, the above-mentioned charge current flows into the capacitor 29b. This charging current is detected by the transistor 29e, and the detected signal is given to the control circuit part 31. The waveform (i) in FIG. 8 shows the collector voltage of the transistor 29e. A period T shown in the waveform (i) in FIG. 8 shows charging time period, which is immediately after switchings of the antenna. The peak voltage in the period that the antenna 13 is selected is held in the capacitor 29b. Since the intensity of the radio-wave from the antenna 14 is greater than that of the antenna 13, the charging current flows into the capacitor 29b during the period T. When the relation of intensities of the radio-waves from the antenna 14 and the antenna 13 is reversed, the waveforms of the voltage of the capacitor 29b and the charging current are as shown in the waveforms (k) and (l) in FIG. 8, respectively. In this case, since the output voltage of the detector 20 is lower than the voltage of the capacitor 29b in the previous period, the charge current does not flows into the capacitor 29b. Therefore, the voltage of the collector of the transistor 29e is zero in the period T. The control circuit part 31 has known mean to compare input signals corresponding to the intensities of the radio-waves from the two antennas 13 and 14 given by the collector voltage of the transistor 29e.

According to this embodiment, the part for comparing the intensity of the radio-wave from the antennas can be configurated as a very simple circuit. Moreover, since the intensity of the two signals are compared by using the same transistors 29a, 29e and the capacitor 29b, there is no trouble that differences of the electric characteristics thereof and of the thermal variation thereof influence the results of the comparison. Therefore, this circuit can be made by using inexpensive electric components.

Since the electric charge in the capacitor 29b is cleared every time when the switch 15 is turned, the intensity of the radio-waves is detected at each switching of the antenna. Since this embodiment execute comparison of the each detected intensity with the total result of the past detection, the comparison result for each antenna is obtained very quickly at the time of switching to that antenna.

Figure 9:
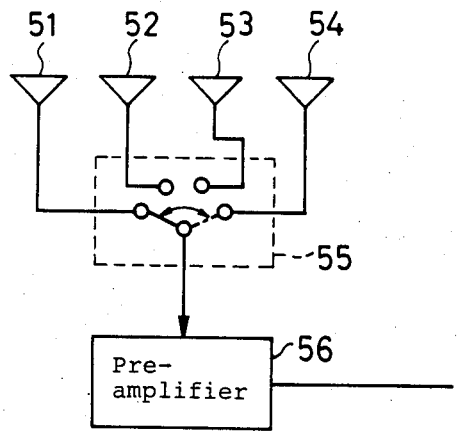
FIG. 9 is a circuit diagram of a switch of the fourth embodiment of the diversity receiver of the present invention.

FIG. 9 is the block diagram of fourth embodiment of the diversity receiver of the present invention. In this embodiment, four antennas are used. In FIG. 9, the four antennas 51, 52, 53 and 54 receive the radio-wave. The switch 55 controls selection of the antennas. The preamplifier 56 amplifies the signal which is received by the antenna. The signal is frequency-converted and is amplified at the receiving part 16-2, wherein the envelope of the signal is detected by the detector 20 by the same process as shown in FIG. 6. Similarly, output signal for showing the reception of the radio-wave is issued at the comparator 21. The comparator 29 has the same configuration as that shown in FIG. 7. The information of the radio-wave is decoded by the frequency discriminator.

Figure 10:
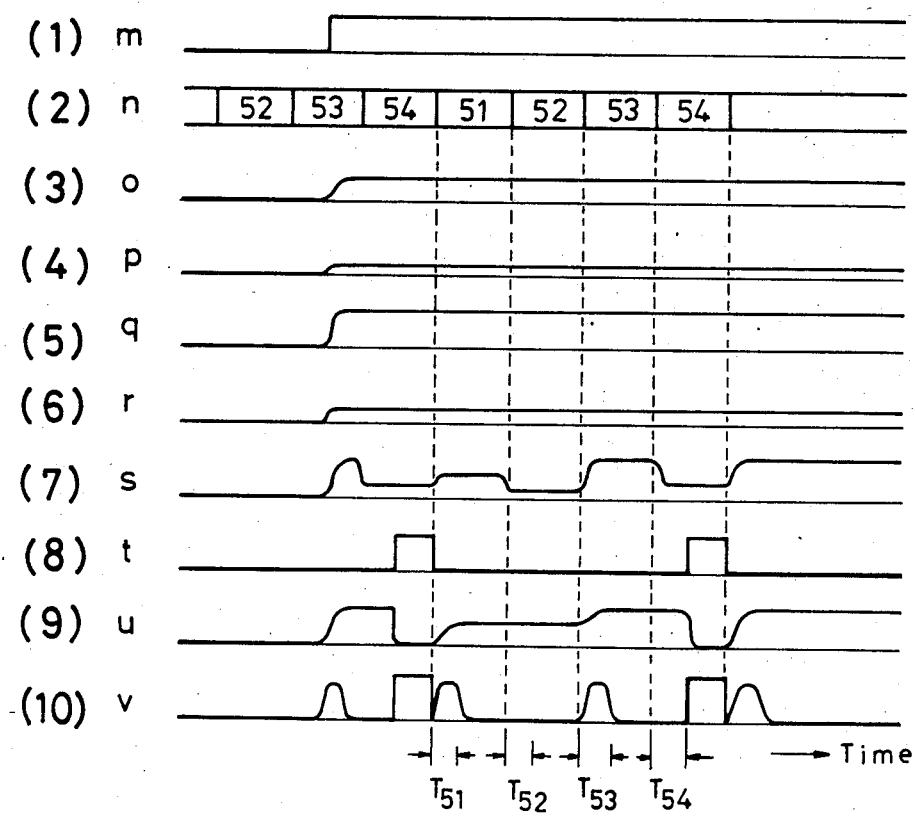
FIG. 10 is a timing chart on the operation of the fourth embodiment of the diversity receiver.

FIG. 10 is a timing chart of the embodiment of FIG. 9. The waveform (m) shows starting of transmission of the radio-wave. The waveform (n) shows the connection of the switch 55, and therein the figures indicate the antennas which have been selected by the switch 55. The waveform (o), (p), (q) and (r) show the intensity of the radio-wave which is received by the four antennas 51, 52, 53 and 54, respectively. The waveform (s) consists of parts of various signals from the detector 20, and therein respective levels of intensities of the radio-waves from the four antennas are included. The waveform (t) shows the signal which is applied to the base of the transistor 29d of the comparator 29 shown in FIG. 7. The transistor 29d is ON in the latter half of the period when the antenna 54 is selected. The waveform (u) shows the voltage of the capacitor 29b, and the peak voltage of the output signal of the detector 20 is held by the capacitor 29b. The waveform (v) shows the charging current which flows through the transistor 29a. The period $T_{51}$, $T_{52}$, $T_{53}$ and $T_{54}$ are the period during which the charge current flow when the antennas 51, 52, 53 and 54 are connected to the preamplifier 56 by the switch 55 in turn. Furthermore, the antenna which have received the strongest radio signal is found as follows. At first, the charging current flows into the capacitor 29b during the period $T_{51}$. Secondly, if the received signal during the period $T_{52}$ is lower than that of the period $T_{51}$, the charging current does not flow into the capacitor 29b. Thirdly, if the received signal during the period $T_{53}$ is greater than that of the period $T_{51}$, the charging current flows into the capacitor 29b. Fourthly, if the received signal during the period $T_{54}$ is lower than that of the period $T_{53}$, the charging circuit does not flow into capacitor 29b, and it is found that the antenna which was connected during the period $T_{53}$ received the most intensive radio-wave signal. The electric charge of the capacitor 29b is discharged after the period $T_{54}$. Above-mentioned process is shown in the waveform (v) of FIG. 10.

According to this embodiment, many antennas are compared with each other quickly by the same comparator 29 shown in FIG. 7, and the inexpensive and superior diversity receiver is realized.

Instead of this embodiment, wherein the comparator 29 comprises the peak hold circuit which has the capacitor and the transistor, the comparator 29 can be constituted with the peak hold circuit using the capacitor and the diode, or with the peak hold circuit using the capacitor and FET. The transistor switch can be realized by the FET, diode or the thyristor. As the circuit for detecting the current, those circuits which have darlington-connection or other composite connection of many transistor to obtain higher sensibility may be used. The control circuit part 31 can be made easily by using the micro-processor or the logic circuit.

As to the aforementioned diversity receiver, the receiving antennas are set up with some intervals to prevent the mutual correlation. Conventionally, the mutual distances between the antennas are selected to several times of wavelength of the used radio-wave. Therefore, the small size diversity receiver cannot be realized with these antennas enclosed therein. For example, in case that the radio-wave of VHF band or UHF band (several ten MHz–several hundreds MHz) is adopted, the wavelength is about one meter. In order to get the diversity effect, the mutual distances of the antennas must be several meters. Therefore, the receiver does not become small.

A devicing to miniaturize the receiver is elucidated as follows.

Figure 11:
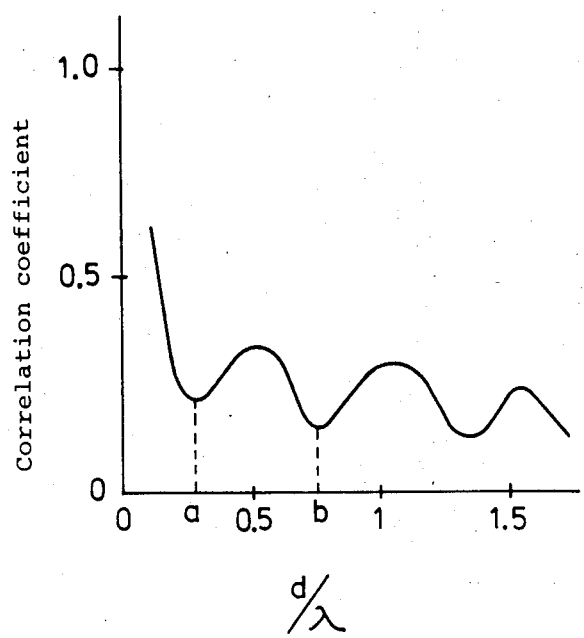
FIG. 11 is a graphi-al representation showing a relation between a distance between the antennas and a correlation coefficient.
Figure 12:
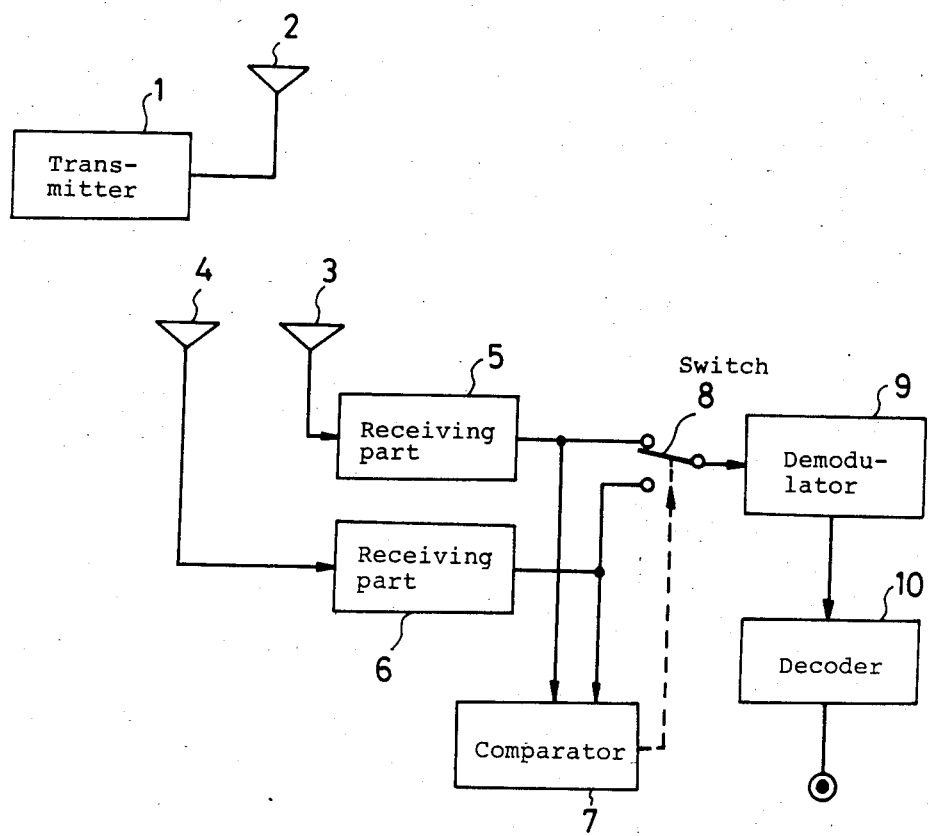
FIG. 12 is a block diagram of the diversity receiver of the prior art.

In FIG. 11, the value that the distance between the antennas is divided by the wavelength is put on the abscissa, and the correlative ratio of the antenna is put on the ordinate. According to this graphical representation, in case that the mutual distance (d) of the antennas is shorter than the wavelength ($\lambda$) of the radio-waves, in a range of $d/\lambda < 1$, there are some infinitesimal value of the correlation coefficient. Therefore, if the antennas are set up at the interval d which is found by the infinitesimal value point (a) or (b) shown in FIG. 11, the low correlative ratio is realized by the short interval of the antennas, and the small size receiver can be realized.

The above-mentioned method can be adopted similarly for setting the plural antennas more than three. Many kinds of the antenna, for example, the loop antenna or the rod antenna, are adopted for it.

What is claimed is:

1. A diversity receiver comprising:
   at least first and second antennas;
   a receiving part for receiving a signal from said antennas;
   connecting means for selectively connecting one of said antennas to said receiving part;
   detecting means for detecting an output signal from said receiving part;
   means for generating a timing signal when said output signal detected by said detecting means has a higher level than a predetermined level;
   means for generating a first control signal to supply to said connecting means for selectively connecting respective antennas during a predetermined period defined by said timing signal;
   means for selecting one antenna which is receiving the most intensive signal by comparing levels of outputs of said detecting means each delivered from said first and second antennas during a period wherein said first control signal is supplied to said connecting means; and
   means for generating a second control signal to connect said receiving part to said one antenna selected by said selecting means during a period wherein said timing signal exists.

2. A diversity receiver in accordance with claim 1, wherein
   said antennas are disposed at locations to have a minimal amount of mutual correlation between said antennas wherein distances between said antennas are shorter than a wavelength of the received signals.

3. A diversity receiver in accordance with claim 1, wherein
   said selecting means comprises:
   plural charging circuits for charging based on signals received from said antennas,
   switch means for connecting said detecting means to one of said plural charging circuits by selective switching, and
   a comparator for comparing levels of said charged signals with each other.

4. A diversity receiver in accordance with claim 3 wherein
   said charging circuit comprises a capacitor and a resistor.

5. A diversity receiver in accordance with claim 3, wherein
said selecting means comprises
a peak-hold circuit for holding a level of received signal voltage from said antennas by charging in a capacitor,
a discharging an circuit for discharging electric charge of said capacitor, and
a current detecting circuit for detecting current for charging said capacitor.

6. A diversity receiver in accordance with claim 1 which further comprises:
a demodulator part for demodulating an output signal from said receiving part, and
a decoder for decoding said output signal of said demodulator.

7. A diversity receiver in accordance with claim 1 which further comprises:
preamplifiers connected between respective antennas and said switch means.

8. A diversity receiver comprising:
at least two antennas,
a receiving part for amplifying and detecting radio-waves from said antennas,
switch means, coupled between said antennas and said receiving part, for selectively connecting said receiving part to one of said antennas,
a peak-hold circuit for holding a value of intensity of a received radio-wave from each of said antennas, by charging a capacitor based on the received radio-wave,
a discharging circuit for discharging an electric charge of said capacitor,
a current detecting circuit for detecting a charging current flowing into said capacitor, and
a control part for controlling an operation of said switch using a detected signal of said current detecting circuit, wherein
said control part compares charging current values of said capacitor to select one antenna receiving the most intensive radio signal, by detecting a largest charging current value, in-turn changing a connection between said receiving part and each of said antennas.

9. A diversity receiver in accordance with claim 8 further comprising:
preamplifiers connected between respective antennas and said switch means.

10. A diversity receiver in accordance with claim 8, wherein
said antennas are disposed at locations having a minimal amount of mutual correlation between said antennas, and wherein distances between said antennas are shorter than a wavelength of the received signals.

* * * * *